Dec. 31, 1968   F. W. KUSSY   3,419,755
MANUAL REVERSING STARTERS FOR ELECTRICAL LOADS
Filed Feb. 6, 1967

INVENTOR.
FRANK W. KUSSY
BY
OSTROLENK, FABER, GERB & SOFFEN
ATTORNEYS

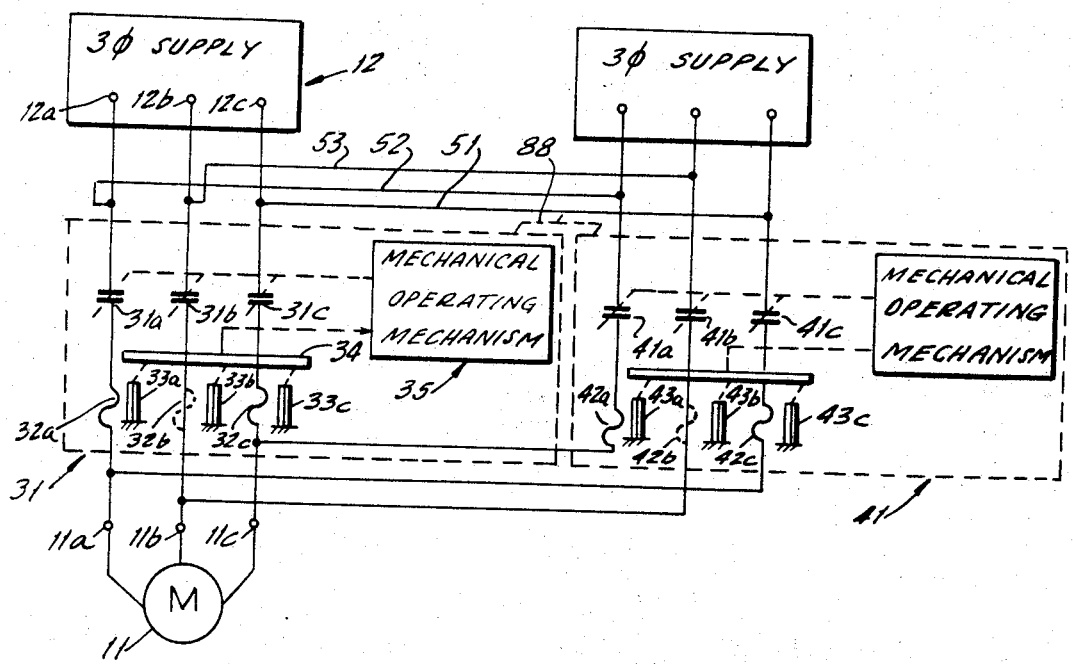
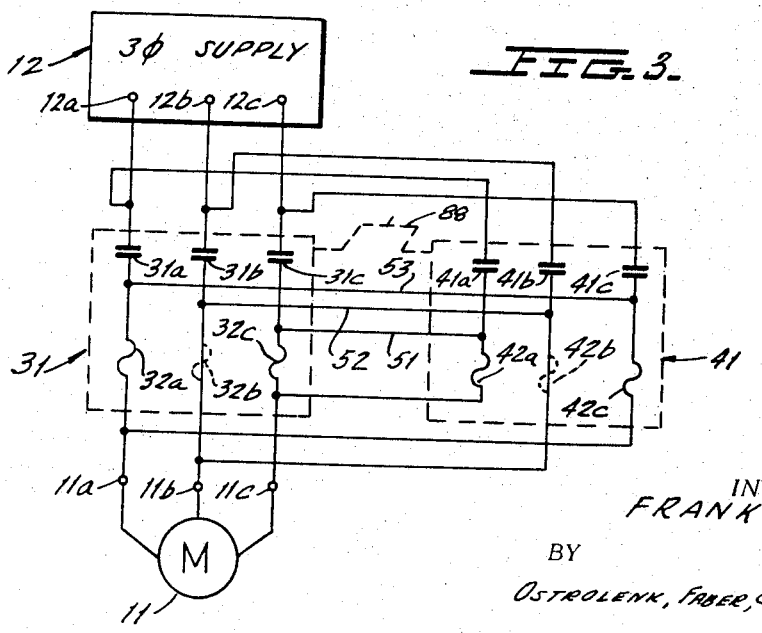

United States Patent Office 3,419,755
Patented Dec. 31, 1968

3,419,755
MANUAL REVERSING STARTERS FOR
ELECTRICAL LOADS
Frank W. Kussy, Birmingham, Mich., assignor to I-T-E
Circuit Breaker Company, Philadelphia, Pa., a corporation of Pennsylvania
Filed Feb. 6, 1967, Ser. No. 614,148
6 Claims. (Cl. 317—13)

ABSTRACT OF THE DISCLOSURE

Manually operated starters for controlling a reversible motor are connected with the thermal overload sensing means of one starter in parallel with the thermal overload sensing means of the other starter. Thus, when either of these starters is closed, the thermal overload sensing means of both starters are subjected to the effects of current energizing the load. In this manner, the heating of the thermal overload means is always indicative of heating conditions at the load so that even if there is frequent alternate operation of these starters heating of the thermal overload sensing means will always be related to load heating so as to always protect the motor or load against damage.

---

This invention relates to starters for reversible motors and more particularly relates to a novel electrical interconnection between manual starters to achieve improved load protection.

When electromagnetic contactors are combined to form a so-called reversing magnetic starter, a single set of overload relays is used in the control circuit regardless of which of the contactors is closed. In this manner, the thermal overload sensing elements of the overload relays are always at a temperature related to the temperature of the motor so that even under unusual motor operating conditions of rapid and frequent rotation reversals the overload sensing elements will be responsive to actual motor conditions and damage due to electrical overload will be prevented.

However, in the prior art when so-called manual reversing starters were utilized, protection was not achieved under the unusual operating conditions outlined above. That is, a so-called manual starter is a mechanically operated switching device having integral thermal automatic trip means so that each of the starters in a reversing circuit hookup has its own thermal automatic trip means. In the prior art the trip means of an individual manual starter was energized only when its starter was closed. Because of this, under conditions of numerous rotation reversals, when the motor is overloaded the thermal overload sensing means of one starter heated only during the period when this starter was closed and cooled when this starter was open even though load temperature continued to increase. Under these conditions, the thermal overload sensing means often did not heat sufficiently to cause tripping or tripping did not occur until after the motor was irreparably damaged.

According to the instant invention, the thermal tripping means of one manual starter is connected in parallel with the thermal trip means of the other manual starter. Thus, both overload trip means are energized when either of the manual starters is closed and because of this, under overload conditions, the overload sensing means are energized whenever the motor is energized and attain a temperature rise related to the temperature rise of the load. Accordingly, even when the direction of motor rotation is changed very often there is a proper correlation between motor temperature and the temperature of the thermal overload sensing means.

Accordingly, a primary object of the instant invention is to provide a novel electrical interconnection between manual reversing starters to achieve improved overload protection.

Another object is to provide a circuit arrangement of this type in which the thermal overload responsive means of both starters are energized whenever either of the starters is closed.

Still another object is to provide electrical interconnections of the foregoing type in which the thermal overload sensing means of one starter is connected in electrical parallel with the thermal overload sensing means of the other starters.

These objects as well as other objects of the instant invention will become readily apparent after reading the following description of the accompanying drawings in which:

FIGURE 2 is an electrical schematic showing prior art connections between a reversible motor and a three phase supply through manual reversing starters.

FIGURE 3 is a simplified version of the schematic of FIGURE 2 with the elements shown being arranged in accordance with the teachings of the instant invention.

Figure 1:
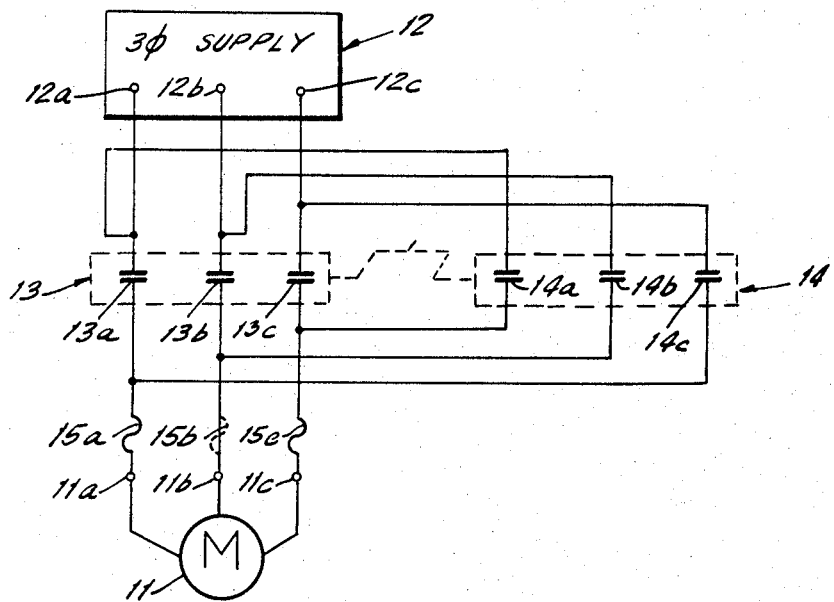
FIGURE 1 is an electrical schematic showing prior art connections between a reversible motor and a three phase supply through magnetic reversing starters.
Figure 1A:
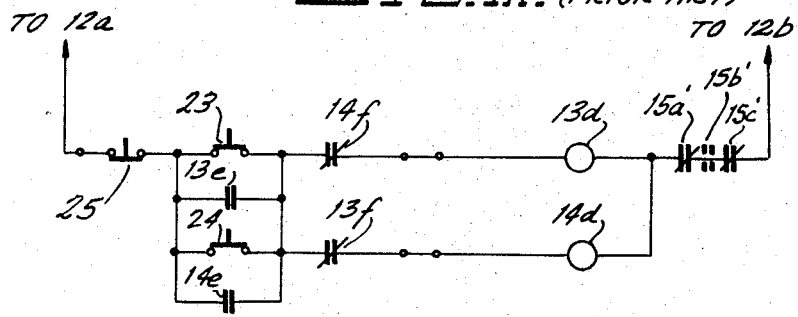
FIGURE 1A is an electrical schematic showing the control circuit for the magnetic reversing starter of FIGURE 1.

Now referring to the figures and more particularly to FIGURES 1 and 1A which show reversible motor 11 connected to three phase supply 12 by means of mechanically interlocked electromagnetic contactors 13, 14 and thermal overload relay heaters 15a, 15b, 15c. More particularly, electromagnetic contactor 13 is a three phase unit having simultaneously operated normally open sets of contacts 13a, 13b, 13c. Similarly, electromagnetic contactor 14 is a three phase unit having simultaneously operated normally open sets of main contacts 14a, 14b, 14c. Further, as is well known to the art, heaters 15a, 15b, 15c heat bimetal means (not shown) so that under predetermined overload conditions, overload relay contacts 15a,' 15b' and 15c' (FIGURE 1A) open to interrupt the control circuit of FIGURE 1A.

Motor terminal 11a is connected to supply terminal 12a through heater 15a and cooperating contacts 13a; motor terminal 11b is connected to supply terminal 12b through heater 15b and the parallel combination of sets of cooperating contacts 13b, 14b; while motor terminal 11c is connected to supply terminal 12c through heater 15c and contacts 13c. Terminals 11a and 12c are connected through heater 15a and cooperating contacts 14c while terminals 11c and 12a are connected through heater 15c and cooperating contacts 14a.

Operating coils 13d, 14d (FIGURE 1A) are provided for operating the contacts of contactors 13, 14, respectively, to their closed positions. Arbitrarily, contactor 13 is designated as the forward starter while contactor 14 is designated as the reverse starter. With the control elements as shown in FIGURE 1A the motor is deenergized in that normally open forward and reverse control switches 23, 24, respectively, are both open. The control circuit for forward operation of motor 11 extends from supply terminal 12a, normally closed stop control 25, normally open forward control 23 paralleled by normally open forward holding contact 13e, normally closed reverse interlock contact 14f, forward coil 13d and the series combination of overload relay contacts 15a', 15b', 15c' to supply terminal 12b. Thus, when forward control 23 is momentarily closed, forward coil 13d is energized closing forward holding contact 13e so that upon opening of forward control 23, coil 13d remains energized and the main contacts 13a, 13b, 13c of forward contactor 13 remain closed.

The reverse control circuit extends from supply terminal 12a through stop control 25, normally open reverse control 24 paralleled by normally open reverse holding contact 14e, normally closed forward interlock contact 13f, reverse coil 14d and the series combination of overload realy contacts 15a', 15b', 15c' to supply terminal 12b. While forward coil 13d is energized, reverse coil 14d cannot be energized in that interlock contacts 13f are open.

To deenergize forward coil 13d, stop control 25 is momentarily opened. Thereafter, operation of reverse control 24 closes holding contact 14e and energizes reverse coil 14d closing main contacts 14a, 14b, 14c of reverse contactor 14 and opening reverse interlock contact 14f. Thus, it is seen that whenever motor 11 is energized, all three heaters 15a, 15b, 15c are also energized so that heating of the latter is directly related to the heating of motor 11.

In the prior art, manual reversing starters 31, 41 are electrically interconnected as in FIGURE 2 to connect motor 11 to three phase supply 12. In particular, manual starter 31 is a three phase circuit interrupter having sets of main contacts 31a, 31b, 31c and a thermally responsive overload sensing means for automatically opening main contacts 31a, 31b, 31c. The thermal overload sensing means consists of heaters 32a, 32b, 32c in electrical series with contacts 31a, 31b, 31c, respectively, and in proximity to bimetal elements 33a, 33b, 33c, respectively. Heating of bimetals 33a, 33b, 33c causes deflection thereof with their free ends being engageable with common trip bar 34 to operate the latter for automatic tripping of mechanical operating mechanism 35 which operates main contacts 31a, 31b, 31c into and out of engagement.

Since the consrtuction of manual starter 41 is identical to the construction of starter 31, no further description of starter 41 will be given. However, it is noted that mechanical interlock 88 is connected between starters 31, 41 in a manner well known to the art to prevent both of the starters 31, 41 from benig closed at the same time.

In the prior art circuit of FIGURE 2, load terminal 11a is connected to line terminal 12a through heater 32a and contacts 31a. Similarly, load terminal 11b is connected to line terminal 12b through heater 32b and contacts 31b while load terminal 11c is connected to line terminal 12c through heater 32c and contacts 31c. Load terminal 11b is also connected to line terminal 12b through heater 42b and contacts 41b. Load terminal 11a is connected to line terminal 12c through heater 42c and contacts 41c while load terminal 11c is connected to line terminal 12a through heater 42a and contacts 41a.

Thus, it is seen that with the circuit connections of FIGURE 2, when starter 31 is closed, the overload sensing heaters 42a, 42b, 42c of starter 41 are deenergized. Conversely, when starter 41 is closed, the overload sensing heaters 32a, 32b, 32c of starter 31 are deenergized. Because of this, should motor 11 be overloaded and operation thereof between forward and reverse be changed often in a short time interval, motor 11 will be subjected to substantially continuous heating while the overload sensing heaters of starters 31 and 41 will be heated only intermittently so that heating of the latter will lag substantially behind heating of motor 11 and motor 11 will not be protected against overheating.

In order to provide full overload protection for motor 11 when connected by manual reversing starters 31, 41 to supply 12, the electrical interconnections are made as shown in FIGURE 3. More particularly, manual starter 31 is interposed between motor 11 and supply 12 in the very same manner as in FIGURE 2. However, three additional jumpers 51, 52, 53 are added. Jumper 51 connects heaters 42a and 32c directly in parallel, jumper 52 connects heaters 32b, 42b directly in parallel and jumper 53 connects heaters 32a and 42c dircetly in parallel.

Thus, when either of the manual starters 31 or 41 of FIGURE 3 are closed, all of the overload heaters 32a, 32b, 32c, 42a, 42b, 42c are energized. Naturally, each of the heaters in FIGURE 3 is rated at half that of each of the heaters of FIGURE 2 so that automatic tripping occurs at the proper time during overload conditions.

Thus, it is seen that the instant invention provides novel electrical interconnections for manual reversing starters whereby the overload heaters of both starters are in circuit when either starter is closed thereby achieving more reliable overload protection than is possible with manual overload starters electrically interconnected in accordance wtih the teachings of the prior art.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A combination comprising an electrical load having a plurality of load terminals, an energizing source for said load including a plurality of line terminals at different electrical potentials, circuit means including first and second interrupters for connecting said line and load terminals; said first interrupter including first cooperating contact means which when closed connects said line terminals to said load treminals in a first circuit configuration whereby said load is energized by said source for operation in a first mode; said second interrupter including second cooperating contact means which when closed connects said line terminals to said load terminals in a second circuit configuration, differing from said first circuit configuration, whereby said load is energized by said source for operation in a second mode; said first interrupter also including first mechanical operating means and first thermally responsive automatic trip means mechanically connected to said first operating means for automatically opening said first cooperating contact means under predetermined overload conditions; said second interrupter also including second mechanical operating means and sceond thermally responsive automatic trip means mechanically connected to said second operating means for opening said second cooperating contact means under predetermined overload conditions; said first thermally responsive trip means including first and second thermal elements connected in circuit with respective first and second of said line terminals when either said first or said second cooperating contact means is closed; said second thermally responsive trip means including third and fourth thermal elements connected in circuit with said first and second thermal elements, respectively, when either said first or said second cooperating contact means is closed.

2. A combination as set forth in claim 1 in which said first thermally responsive trip means also includes first and second bimetals mounted in close proximity to said first and second thermal elements, respectively; said second thermally responsive trip means also including third and fourth bimetals mounted in close proximity to said third and fourth thermal elements, respectively.

3. A combination as set forth in claim 1 in which said electrical load is a reversible motor and said energizing source is a three phase supply.

4. A combination as set forth in claim 1 in which said first and third thermal elements are in connected electrical parallel; said second and said fourth thermal elements connected in electrical parallel.

5. A combination as set forth in claim 4 in which said first cooperating contact means includes first and second sets of contacts in series with said first and second thermal elements, respectively; said second cooperating contact means including third and fourth sets of contacts in series with said third and fourth thermal elements, respectively; said first and said fourth sets of contacts both connected in circuit with said first line terminal; said second and said third sets of contacts both connected in circuit with said second line terminal.

6. A combination as set forth in claim 5 in which there are fixed jumper means providing parallel connections between said first and third thermal elements and additional fixed jumper means providing parallel connections between said second and fourth thermal elements.

References Cited

UNITED STATES PATENTS

| | | | |
|---|---|---|---|
| 2,486,004 | 10/1949 | Clark | 317—48 |
| 2,922,925 | 1/1960 | Gerrard | 317—48 X |

JOHN F. COUCH, *Primary Examiner.*

J. D. TRAMMELL, *Assistant Examiner.*

U.S. Cl. X.R.

317—40, 48; 318—289, 293